United States Patent
Taylor et al.

(10) Patent No.: US 10,958,460 B2
(45) Date of Patent: Mar. 23, 2021

(54) CONNECTING MULTIPLE NETWORKS FOR MULTICAST GROUPS

(71) Applicant: Itron, Inc., Liberty Lake, WA (US)

(72) Inventors: James Laurence Taylor, Sherborne (GB); Jerome Bartier, Edinburgh (GB); Viet-Hung Nguyen, Saint-Mande (FR)

(73) Assignee: Itron, Inc., Liberty Lake, WA (US)

( * ) Notice: Subject to any disclaimer, the term of this patent is extended or adjusted under 35 U.S.C. 154(b) by 155 days.

(21) Appl. No.: 16/143,109

(22) Filed: Sep. 26, 2018

(65) Prior Publication Data

US 2020/0099543 A1  Mar. 26, 2020

(51) Int. Cl.
*H04L 12/18*    (2006.01)
*H04L 12/721*   (2013.01)
*H04W 84/18*    (2009.01)

(52) U.S. Cl.
CPC .......... *H04L 12/185* (2013.01); *H04L 12/189* (2013.01); *H04L 45/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,331,637 A | 7/1994 | Francis et al. | |
| 6,269,085 B1 | 7/2001 | Provino et al. | |
| 6,636,895 B1 * | 10/2003 | Li | H04L 45/02 370/351 |
| 10,616,093 B2 * | 4/2020 | Jadhav | H04W 40/04 |
| 2002/0021697 A1 * | 2/2002 | Tsuchiya | H04L 69/16 370/392 |
| 2005/0180447 A1 * | 8/2005 | Lim | H04L 12/185 370/432 |
| 2007/0127473 A1 | 6/2007 | Kessler et al. | |
| 2009/0052448 A1 | 2/2009 | Ramakrishnan et al. | |
| 2010/0020797 A1 * | 1/2010 | Casey | H04L 45/026 370/390 |

(Continued)

FOREIGN PATENT DOCUMENTS

| | | |
|---|---|---|
| JP | 2005229623 | 8/2005 |
| WO | WO2015135816 | 9/2015 |

OTHER PUBLICATIONS

The PCT Search Report and Written Opinion dated Nov. 20, 2019, for PCT Application No. PCT/US2019/053004, 12 pages.
Internet Engineering Task Force (IETF), "Multicast Protocol for Low-Power and Lossy Networks (MPL)," retrieved on Jul. 1, 2019 from <<https://datatracker.ietf.org/doc/rfc7731/>> Feb. 2016, 3 pages.

(Continued)

*Primary Examiner* — Ayaz R Sheikh
*Assistant Examiner* — Faiyazkhan Ghafoerkhan
(74) *Attorney, Agent, or Firm* — Lee & Hayes, P.C.

(57) ABSTRACT

Techniques for connecting networks to facilitate distribution of data are described. For example, to distribute multicast data to members of a multicast group that span multiple networks, the techniques may identify a path between networks that each have a member of the multicast group, such as a shortest path between networks. The techniques may inform the networks on the path to establish a connection with an adjacent network. This may allow multicast data for a multicast group to be distributed to members of the multicast group that are located in separate networks.

20 Claims, 7 Drawing Sheets

(56) References Cited

U.S. PATENT DOCUMENTS

| | | | | |
|---|---|---|---|---|
| 2010/0054245 | A1* | 3/2010 | Asati | H04L 45/16 370/390 |
| 2012/0039186 | A1* | 2/2012 | Vasseur | H04W 40/248 370/248 |
| 2013/0077627 | A1 | 3/2013 | Appalla et al. | |
| 2013/0080602 | A1* | 3/2013 | Keesara | H04L 12/4625 709/220 |
| 2013/0121335 | A1* | 5/2013 | Hui | H04L 12/18 370/390 |
| 2013/0227114 | A1* | 8/2013 | Vasseur | H04L 41/044 709/224 |
| 2013/0227336 | A1* | 8/2013 | Agarwal | H04L 45/22 714/4.3 |
| 2013/0250949 | A1* | 9/2013 | Farinacci | H04L 12/1836 370/390 |
| 2014/0126575 | A1* | 5/2014 | Janneteau | H04L 45/745 370/390 |
| 2015/0055652 | A1 | 2/2015 | Yong et al. | |
| 2016/0142248 | A1 | 5/2016 | Thubert et al. | |
| 2016/0149856 | A1* | 5/2016 | Hui | H04L 45/74 370/252 |
| 2016/0254987 | A1 | 9/2016 | Eckert et al. | |
| 2016/0277201 | A1* | 9/2016 | Thubert | H04L 1/1614 |
| 2017/0019804 | A1* | 1/2017 | Morchon | H04L 12/1877 |
| 2017/0264532 | A1* | 9/2017 | Guo | H04W 40/04 |
| 2017/0273002 | A1* | 9/2017 | Chen | H04W 40/246 |
| 2018/0054782 | A1* | 2/2018 | Qi | H04W 52/0235 |
| 2018/0145841 | A1* | 5/2018 | Thubert | H04L 1/1614 |
| 2019/0165961 | A1 | 5/2019 | Bartier et al. | |
| 2019/0165962 | A1 | 5/2019 | Bartier et al. | |
| 2019/0165964 | A1 | 5/2019 | Bartier et al. | |
| 2019/0363951 | A1* | 11/2019 | Vasseur | H04W 24/02 |

OTHER PUBLICATIONS

Internet Engineering Task Force (IETF), "Multicast Using Bit Index Explicit Replication (BIER)," retrieved on Jul. 1, 2019 at <<https://datatracker.ietf.org/doc/rfc8279/>> Last updated Jun. 5, 2018, 3 pages.

IPR Details, "Lars Eggert's Statement about IPR related to draft-ietf-rolltrickle-mcast belonging to Nokia Corporation," retrieved on Jul. 1, 2019 from <<https://datatracker.ietf.org/ipr/1858/>> submitted on Aug. 3, 2012, 3 pages.

IPR, "Document IPR search results for draft-ietf-bier architecture," retrieved on Jul. 1, 20219 from <<https://datatracker.ietf.org/ipr/search/?submit=draft&id=draft-ietf-bier-architecture>> 3 pages.

Office action for U.S. Appl. No. 15/824,696, dated Jan. 26, 2019, Bartier, "Limiting Forwarding of Multicast Communications", 24 pages.

PCT Search Report and Written Opinion dated Feb. 18, 2019, for PCT Application No. PCT/US2018/062626, 13 pages.

PCT Search Report and Written Opinion dated Mar. 7, 2019 for PCT Application No. PCT/US2018/062638, 12 pages.

Office action for U.S. Appl. No. 15/824,898, dated Aug. 1, 2019, Bartier, "Multi-Network Operation With Member Node for Multicast Groups", 16 pages.

Lorente, Guillermo Gaston et al. "BMRF: Bidirectional Multicast RPL Forwarding", Department of Electronics and Informatics, University of Brussel, Oct. 5, 2016, 16 pages.

Tsvetkov, Tsvetko "RPL: IPv6 Routing Protocol for Low Power and Lossy Networks", Network Architectures and Services, Jul. 2011, 8 pages.

Vasseur, JP et al. "RPL: IPv6 Routing Protocol for Low-Power and Lossy Networks", retrieved on Sep. 21, 2017 from <<http://www.rfc-archive.org/getrfc.php?rfc>>, 170 pages.

\* cited by examiner

CONNECTING MULTIPLE NETWORKS FOR MULTICAST GROUPS

BACKGROUND

Nodes are often configured in a tree-like network structure, such as a Destination Oriented Directed Acyclic Graph (DODAG) with parent nodes, child nodes, and a root node. In many instances, a node belongs to one DODAG, and one network (e.g., one Personal Area Network (PAN)) at a given moment in time. The nodes often communicate multicast data to each other through the DODAG. For example, a node will forward multicast data destined for members of a multicast group upwards in the network node-by-node to reach a root node. The root node will then distribute the multicast data back down into the network node-by-node to reach the members of the multicast group. In many instances, nodes of separate networks (and separate DODAGs) belong to the same multicast group. Since the nodes are only configured to communicate within their own networks (e.g., intra-PAN communication), this results in members of a multicast group not receiving multicast data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes techniques directed to connecting networks to facilitate distribution of data, such as multicast data. As noted above, in examples, nodes of separate networks (and separate DODAGs) may belong to the same multicast group. In order to distribute multicast data to members of the multicast group that span multiple networks, the techniques may identify a path between networks that each have a member of the multicast group, such as a shortest path between networks. The techniques may inform the networks on the path to establish a connection with an adjacent network. This may allow multicast data for a multicast group to be distributed to members of the multicast group that are located in separate networks.

In one illustration, a root node of a network collects information from nodes of its network to send to a central agent. In particular, the root node receives subscription messages regarding subscriptions (e.g., membership) of nodes of its network to one or more multicast groups. The root node may also receive messages originating from nodes of adjacent networks and/or messages from nodes in its network indicating that the nodes can hear a node in an adjacent network. The root node may compile a list of multicast groups that have members in its network and a list of adjacent networks that can communicate with the network. These lists may be sent to the central agent. In some examples, the root node also sends information indicating a cost of communicating with an adjacent network. In a similar fashion, other root nodes of other networks may compile lists and send those lists (and information regarding communication costs to adjacent networks) to the central agent.

The central agent may analyze the information from the root nodes to determine how to bridge communication for a multicast group (e.g., bridge requirement for the multicast group). For example, the central agent may determine networks that have members of the same multicast group and/or determine adjacencies between networks. The central agent may then use a path algorithm, such as a shortest-path algorithm, to determine if each network with a member of the multicast group can be reached from any other network with a member of the same multicast group. For example, the central agent may determine that a path of networks, such as a shortest path, exists from each network associated with the multicast group to other networks associated with the multicast group. The central agent may use such information about paths to determine how to bridge communication between networks that have members of the same multicast group. For example, the central agent may send a message to a root node of a network along a path requesting that communication between two or more networks be bridged for the multicast group.

This process may be repeated any number of times for any number of multicast groups. As such, connection points between networks may be created for various multicast groups.

The techniques are discussed in many instances in the context of a hierarchical tree-like network. For example, the techniques may be implemented within a Routing Protocol for Low Power and Lossy Networks (RPL) where nodes are configured in a DODAG. However, the techniques may be applied to other types of networks, such as a mesh network. Further, although the techniques may be discussed in the context of multicast communication with any node of the network originating multicast data for members of a multicast group (e.g., anysource multicast), the techniques may be applied to other types of communication, such as unicast, and so on. In one example of unicast communication, a central agent may determine if a graph of deployment (e.g., a set of networks) is fully connected (e.g., if a network that is attempting to send data is able to connect to a destination network through one or more intermediary networks). If so, the central agent may determine a path (e.g., a shortest path).

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communication network, control network, and/or another type of network or system. In one example, the techniques may be implemented in the context of the Internet of Things (IoT).

Example Environment

Figure 1:
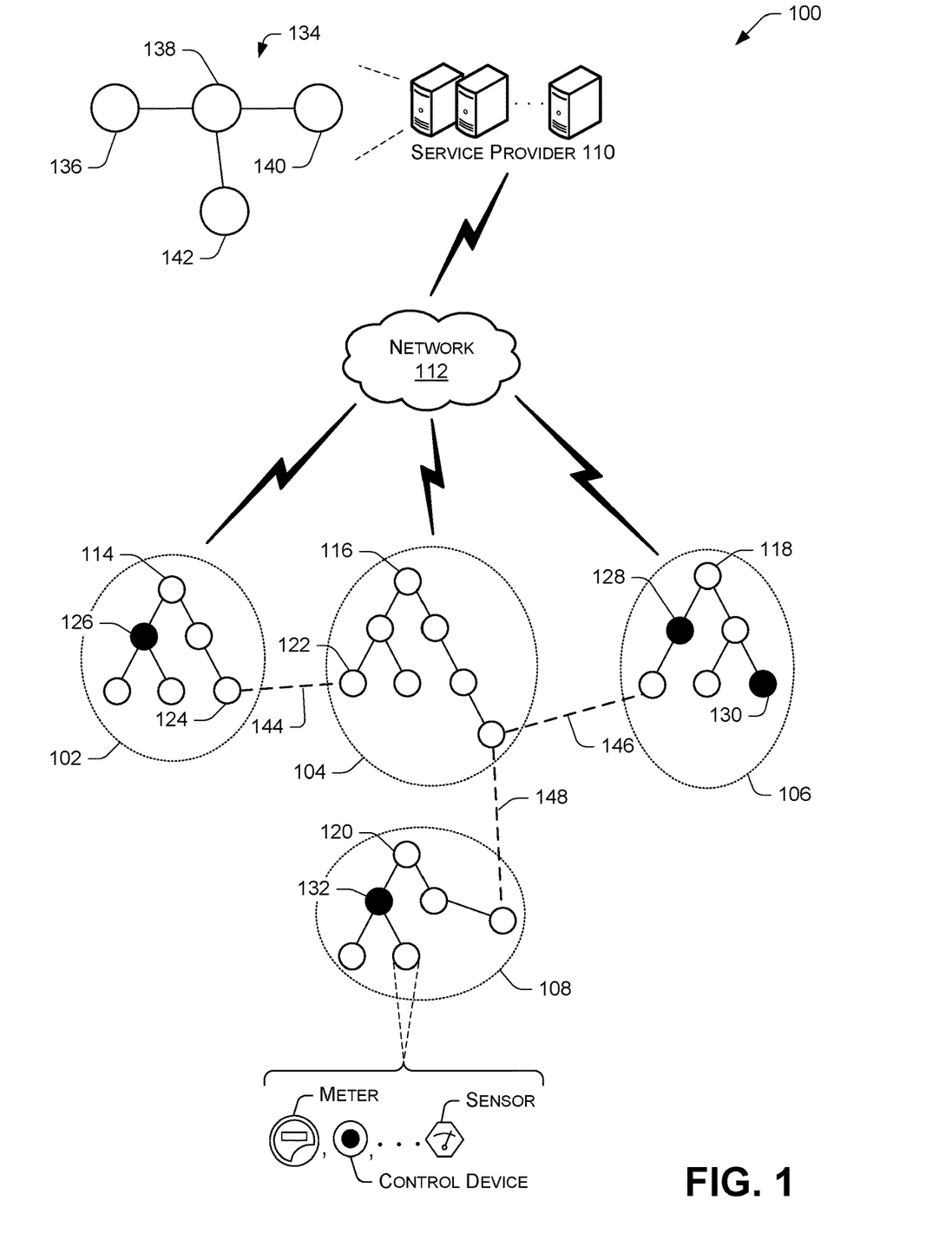
FIG. 1 is a schematic diagram of an example network architecture.

FIG. 1 is a diagram illustrating an example networked environment or architecture 100. The architecture 100 includes a first Area Network (AN) 102, a second AN 104, a third area network 106, and a fourth AN 108. For ease of illustration, four networks are shown. However, the architecture 100 may include any number of networks (e.g., more or less than that illustrated). Each of the ANs 102-108 may include any number of network communication devices (sometimes referred to as nodes or devices). Each of the ANs 102-108 (e.g., nodes in the ANs 102-108) may communicate with a service provider 110 via one or more networks 112 (e.g., a backhaul network), such as the Internet. For example, a node 114 may act as a root node to connect nodes of the first AN 102 to the service provider 110 via the one or more networks 112, a node 116 may act as a root node to connect nodes of the second AN 104 to the service provider 110 via the one or more networks 112, a node 118 may act as a root node to connect nodes of the third AN 106 to the service provider 110 via the one or more networks 112, and a node 120 may act as a root node to connect nodes of the fourth AN 108 to the service provider 110 via the one or more networks 112. For instance, the nodes of the first AN 102 may be configured in a Destination Oriented Directed Acyclic Graph (DODAG) with the node 114 acting as the DODAG root.

As used herein, the term "Area Network" (AN) may refer to a defined group of devices that are in communication with one another via one or more wired or wireless links. Examples of ANs include, for example, Local Area Networks (LANs), Wide Area Networks (WANs), Neighborhood Area Networks (NANs), Personal Area Networks (PANs), Home Area Networks (HANs), Field Area Networks (FANs), and so on. In some instances, multiple ANs exist and collectively define a larger network, such as an advanced metering infrastructure (AMI) of a utility communication network. In general, a network communication device is a member of a particular AN. Although in some instances, a network communication device may be a member of multiple ANs. Further, over time, network communication devices may migrate from one AN to another geographically proximate or overlapping AN based on a variety of factors, such as respective loads on the ANs, battery reserves, interference, or the like.

The term "link" may refer to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may include a data channel(s) and/or a control channel(s) that is designated for communicating messages to specify the data channel(s) to be utilized to transfer data. Transmissions on a control channel may be shorter relative to transmissions on a data channel. The AN may implement a channel hopping sequence, such that a channel may change over time.

The service provider 110 may provide remote resources to network communication devices. In some instances, the service provider 110 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data (e.g., data regarding usage of water, gas, electricity, etc. at a meter) from network communication devices, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data. In some instances, the service provider 110 may be referred to as a central agent.

The service provider 110 may be physically located in a single central location or may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The service provider 110 may be implemented as one or more computing devices including servers, desktop computers, or the like. In one example, the service provider 110 is configured in a server cluster, server farm, data center, mainframe, cloud computing environment, or a combination thereof. To illustrate, the service provider 110 may operate as a cloud computing device that provides cloud services, such as storage, processing, and so on.

Network communication devices and/or the service provider 110 may transmit and/or receive Protocol Data Units (PDUs). A PDU may comprise a bit, frame, packet, segment, or another unit of data. A PDU may include control data and/or payload data. As used herein, a message, transmission, communication, or the like may refer to any type of PDU.

In some examples, network communication devices and/or the service provider 110 may perform various operations to facilitate the techniques discussed herein. For example, the root node 114 may collect information from nodes of the first AN 102. In particular, the root node 114 may receive subscription messages indicating that nodes in the first AN 102 are subscribing to one or more multicast groups. The subscription messages may origination from any lower level in the first AN 102 and bubble-up to the root node 114. The root node 114 may also receive messages originating from nodes of an adjacent AN (e.g., a node 122 in the second AN 104) and/or messages from nodes in the first AN 102 indicating that the nodes can hear a node in an adjacent AN (e.g., a message from a node 124 indicating that it can hear the node 122). The root node 114 may compile a list of multicast groups that have members in the first AN 102 (also referred to as subscription information) and/or a list of ANs that can communicate with the first AN 102 (also referred to as AN adjacency information). The root node 114 may send any of these lists to the service provider 110. In the example of FIG. 1, the root node 114 sends a message to the service provider 110 indicating that the first AN 102 has one or more members of a particular multicast group (e.g., a node 126 is a member). The message also indicates that the second AN 104 is adjacent to the first AN 102.

In some examples, the root node 114 determines a cost of communicating with an adjacent AN. The cost may represent or include a data rate for communicating with the adjacent AN (e.g., a data rate between the node 124 of the first AN 102 and the node 122 of the second AN 104 that are able to communicate with each other), a distance to the adjacent AN (e.g., a distance between the node 124 and the node 122), and/or a communication load associated with the adjacent AN (e.g., an average number of communications sent/received by nodes of the second AN 104, an average length of communications sent/received by nodes of the second AN 104, a number of nodes associated with the second AN 104, etc.). In some examples, the root node 114 determines a cost of its own communication (e.g., a communication load associated with the first AN 102). The root node 114 may send a message to the service provider 110 indicating the cost of communicating with the adjacent AN (and/or the cost of its own communication).

In a similar fashion, the root nodes 116-120 may compile lists and/or information and send those lists and/or information to the service provider 110. For example, the root node 116 may send a message indicating that the first AN 102, the third AN 106, and the fourth AN 108 are each adjacent to the second AN 104. In this example, the second AN 104 does not include a member of the particular multicast group. The root node 118 may send a message indicating that the second AN 104 is adjacent to the third AN 106 and indicating that the third AN 106 has members of the particular multicast group (e.g., nodes 128 and 130). Further, the root node 120 may send a message indicating that the second AN 104 is adjacent to the fourth AN 108 and indicating that the fourth AN 108 has a member of the particular multicast group (e.g., a node 132).

The service provider 110 may analyze information received from the root nodes 114-120 to determine, for each multicast group, ANs that have members in that multicast group. For example, based on subscription information, the service provider 110 may determine that the first AN 102, the third AN 106, and the fourth AN 108 each have at least one member of the particular multicast group illustrated in FIG. 1. The service provider 110 may determine ANs for each multicast group.

The service provider 110 may analyze information received from the root nodes 114-120 to determine adjacencies between ANs. For example, based on AN adjacency information, the service provider 110 may determine that the first AN 102 is adjacent to the second AN 104, that the second AN 104 is adjacent to the first AN 102, the third AN 106, and the fourth AN 108, that the third AN 106 is adjacent to the second AN 104, and that the fourth AN 108 is adjacent to the second AN 104. An adjacency between a first AN and a second AN may indicate that the first AN is able to communicate with the second AN (e.g., a node of the first AN is able to communicate with a node of the second AN).

The service provider 110 may represent the ANs 102-108 with a graph of nodes and edges. The nodes may represent the ANs 102-108 and the edges may represent adjacencies between the ANs 102-108. For example, the service provider 110 may generate a graph 134 with a node 136 representing the first AN 102, a node 138 representing the second AN 104, a node 140 representing the third AN 106, and a node 142 representing the fourth AN 108. Each edge between the nodes 136-142 may be associated with a weight that corresponds to a cost of communication (e.g., the weight may be the same as the cost or scaled from the cost). For example, if the cost of communicating between the first AN 102 and the second AN 104 is relatively high (e.g., 7 on a scale of 1-10, as indicated in information provided by the root node 114), then the corresponding weight for the edge between the node 136 and the node 138 may be relatively high (e.g., a weight of 7).

The service provider 110 may then use a path algorithm to determine if an AN with a member of a multicast group can be reached from any other AN with a member of the multicast group. In examples, the path algorithm includes a shortest-path algorithm, such as a Dijkstra algorithm, a Floyd-Warshall algorithm, an Open Shortest Path First (OSPF) algorithm, etc. In particular, the service provider 110 may provide the graph of nodes and edges (with the weights) as inputs to the path algorithm. In the example of FIG. 1, the service provider 110 may implement the path algorithm for each of the ANs that include a member of the particular multicast group to see if other ANs with a member can be reached. For example, the service provider 110 may use the path algorithm a first time with a [source]:[target] input of [the node 136]:[the node 140] to determine a path between the node 136 and the node 140 (e.g., the node 136, the node 138, and the node 140). The service provider 110 may use the path algorithm a second time with a [source]:[target] input of [the node 136]:[the node 142] to determine a path between the node 136 and the node 142 (e.g., the node 136, the node 138, and the node 142). The service provider 110 may use the path algorithm a third time with a [source]:[target] input of [the node 140]:[the node 136] to determine a path between the node 140 and the node 136 (e.g., the node 140, the node 138, and the node 136). The service provider 110 may use the path algorithm a fourth time with a [source]:[target] input of [the node 140]: [the node 142] to determine a path between the node 140 and the node 142 (e.g., the node 140, the node 138, and the node 142). The service provider 110 may use the path algorithm to a fifth time with a [source]:[target] input of [the node 142]:[the node 136] to determine a path between the node 142 and the node 136 (e.g., the node 142, the node 138, and the node 136). The service provider 110 may use the path algorithm a sixth time with a [source]:[target] input of [the node 142]:[the node 140] to determine a path between the node 142 and the node 140 (e.g., the node 142, the node 138, and the node 140). In some examples, if a path is found one way, the service provider 110 may not find (or may ignore) a path in the opposite direction (e.g., if a path is found from the node 136 to the node 140, a path will not be found from the node 140 to the node 136 and/or the path from the node 140 to the node 136 is considered equivalent and is ignored). As such, the path algorithm may output a path between a source node and a target node.

The service provider 110 may use information about paths to bridge communication between networks that have members of the same multicast group. For example, for the particular multicast group illustrated in FIG. 1, the service provider 110 may determine that the second AN 104 should act as a bridge between the first AN 102 and the third AN 106 and between the first AN 102 and the fourth AN 108, since the second AN 104 is along one or more paths between ANs that have a member of the particular multicast group. As such, the service provider 110 may send a message to the root node 116 of the second AN 104 instructing the second AN 104 to form a connection (also referred to as a bridge) with the first AN 102, a connection with the third AN 106, and a connection with the fourth AN 108, for example. Although the message is sent to the second AN 104 in this example, a message may alternatively, or additionally, be sent to any of the root nodes 114-120 of any of the ANs 102-108 to form a connection to an adjacent AN.

Upon receiving such message, the root node 116 may cause a connection 144 to be formed with the first AN 102, a connection 146 to be formed with the third AN 106, and a connection 148 to be formed with the fourth AN 108, if a connection is not already established to the adjacent AN. For example, the root node 116 may select a node to establish a connection to an adjacent AN and communicate with the node to instruct it to act as a bridge to the adjacent AN. Example operations for facilitating such connections are discussed in further detail below.

In some examples, network communication devices may perform operations to form a Point-to-Multipoint Sub-Tree (PST) for a multicast group and/or distribute multicast data according to the PST. Example techniques for forming a PST are discussed in U.S. patent application Ser. No. 15/824,817, filed Nov. 28, 2017 (entitled "Multi-Network Operation for Multicast Groups"), the entire contents of which are incorporated herein by reference.

In some examples, the techniques may be implemented in the context of a hierarchal network structure, such as a tree. Each node of the network may be connected wirelessly and/or wired to a parent node and/or child node. Each node may be associated with a hierarchical level, with a root node being associated with the highest level. As communications are sent upward in the network (i.e., uplink—from child-to-parent), the communications travel closer to the root node. Meanwhile, as communications are sent downward in the network (i.e., downlink—from parent-to-child), the communications travel farther from the root node.

Although the techniques are discussed in many instances with the ANs being implemented as hierarchal structures having parent and child nodes, such as DODAGs, in some instances the ANs may be implemented in different network structures. For example, an AN may be implemented in whole or part by other types of networks, such as hub-and-spoke networks, mobile networks, cellular networks, etc. Regardless of the topology of an AN, individual network communication devices may communicate by wireless (e.g., radio frequency) and/or wired (e.g., power line communication, Ethernet, serial, etc.) connections.

Example Network Communication Device

Figure 2:
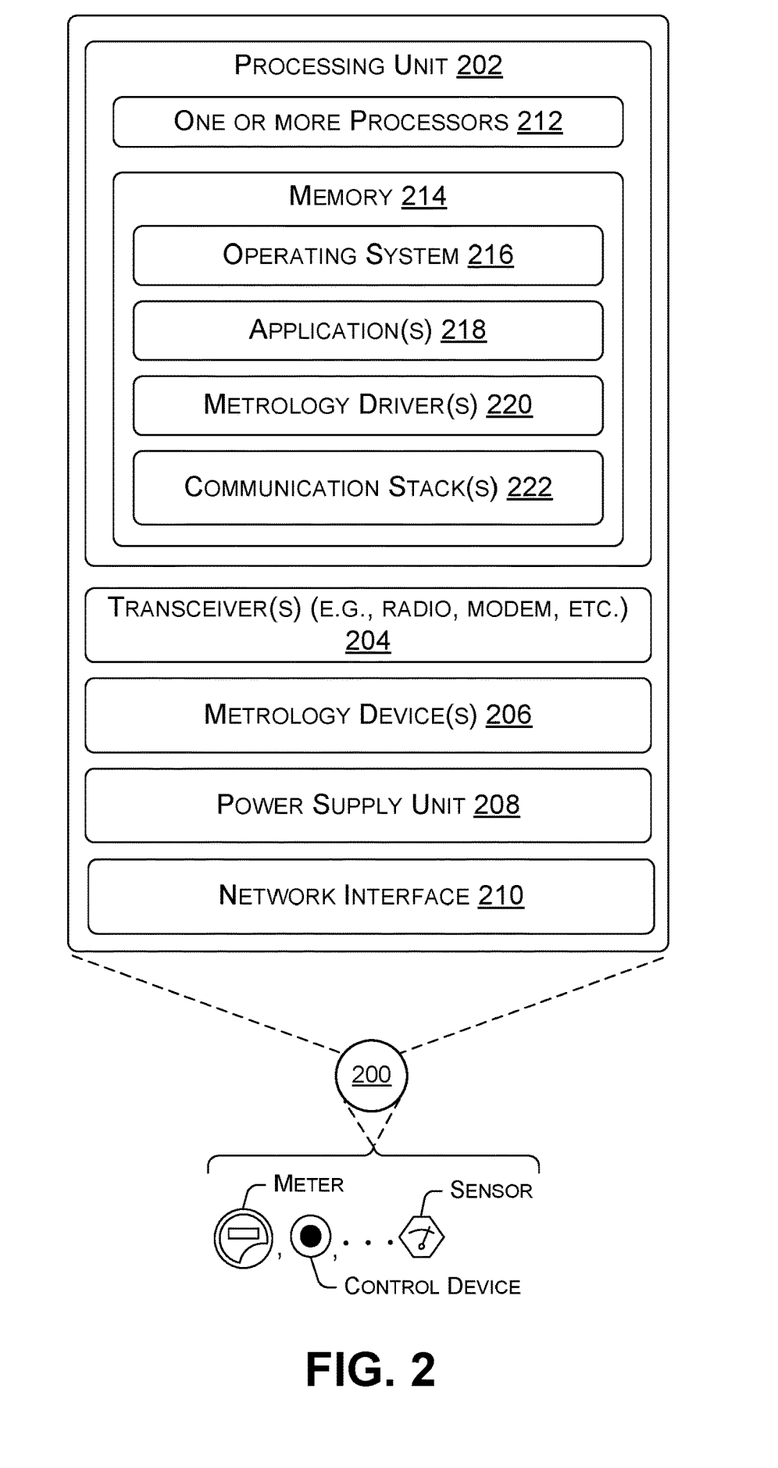
FIG. 2 is a diagram showing details of an example network communication device.

FIG. 2 is a diagram showing details of an example node 200, such as any of the network communication devices of FIG. 1. The node 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on. In some examples, the node 200 is implemented as an edge device, such as a FAR, a cellular relay, a cellular router, an edge router, a DODAG (Destination Oriented Directed Acyclic Graph) root, a root device, and so on.

In some instances, the node 200 comprises a Limited Function Device (LFD), while in other instances the node 200 comprises a Full Function Device (FFD). An FFD may include more functionality/resources than an LFD, such as different processing powers, processing capabilities, power reliance, etc. In one example, an FFD is implemented as Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life.

While FFDs and LFDs may have the similar components, the components may differ due to the different constraints. As one example, while both an FFD and an LFD have transceivers, the specific transceivers used may be different. For instance, a transceiver on an FFD may include a PLC modem, while a transceiver on an LFD may not because it is not connected to an electrical power line that could be used for PLC communications. Additionally, or alternatively, a transceiver on an LFD may employ a lower power RF radio than and FFD to minimize energy consumption. Further, other components of the FFDs and LFDs may vary. In some instances, an LFD is implemented with less functionality and/or include less hardware components than an FFD. Further, in some instances components of an LFD are lower power components than the corresponding components of an FFD.

In one example, a root node comprises an FFD, and child nodes to the root node each comprise an LFD. In another example, a root node comprises an LFD, and child nodes to the root node comprise one or more LFDs and/or FFDs.

As shown in FIG. 2, the example node 200 includes a processing unit 202, a transceiver 204 (e.g., radio, modem, etc.), one or more metrology devices 206, a power supply unit 208, and a network interface 210. The processing unit 202 may include one or more processors 212 and memory 214. The one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in an AN or another network. The transceiver 204 may additionally or alternatively include a modem to provide power line communication (PLC) communication with other network communication devices that are connected to an electrical service grid.

The metrology device(s) 206 may comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver 204 and/or the network interface 210. The consumption data may be formatted and/or packetized in a manner or protocol for transmission.

The power supply unit 208 may provide power to the node 200. In some instances, such as when the node 200 is implemented as a FFD, the power supply unit 208 comprises a mains power connector that couples to an Alternating Current (AC) or Direct Current (DC) mains power line where the node 200 is installed. In other instances, such as when the node 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 214 includes an operating system (OS) 216 and one or more applications 218 that are executable by the one or more processors 212. The memory 214 may also include one or more metrology drivers 220 configured to receive, interpret, and/or otherwise process metrology data collected by the metrology device(s) 206. Additionally, or alternatively, the one or more applications 218 may be configured to receive and/or act on data collected by the metrology device(s) 206.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the node 200 is intended to be compatible. The communication stack(s) 222 describe the functionality and rules governing how the node 200 interacts with each of the specified types of networks. For instance, the communication stack(s) 222 may cause network communication devices to operate in ways that minimize the battery consumption of the network communication devices when they are connected to these types of networks.

The memory 214 may also store other information. For example, the memory 214 may include a data structure that stores a member state indicating whether or not the node 200 is a member of a multicast group, a conscript state indicating whether or not the node 200 is acting as a bridge, information about sub-nodes or child nodes (e.g., subscriptions of child nodes to multicast groups, identifiers of multicast groups for sub-node or child nodes, any of the other information mentioned (but for a child node), etc.), identifiers of networks that have communicated with the network in which the node 200 is located, a cost of communicating with a neighboring/adjacent node, and so on. In some examples, such as when the node 200 is implemented as a root node, the memory 214 may store a list of multicast groups that have members in its network (also referred to as subscription information) and/or a list of ANs that can communicate with its network (also referred to as network adjacency information).

In some instances, the node 200 may be configured to send or receive communications on multiple channels simultaneously. For example, the transceiver(s) 204 may be configured to receive data at the same time on hundreds of channels. Additionally, or alternatively, in examples, the transceiver(s) 204 may be configured to send data at the same time on hundreds of channels.

The various memories described herein (e.g., the memory 214) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices (e.g., the node 200) are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing.

By way of example and not limitation, the node 200 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a medium access control (MAC) sub-layer of a device may be able to indicate to a physical layer the modulation technique and data rate to be used for each transmission.

Example Service Provider

Figure 3:
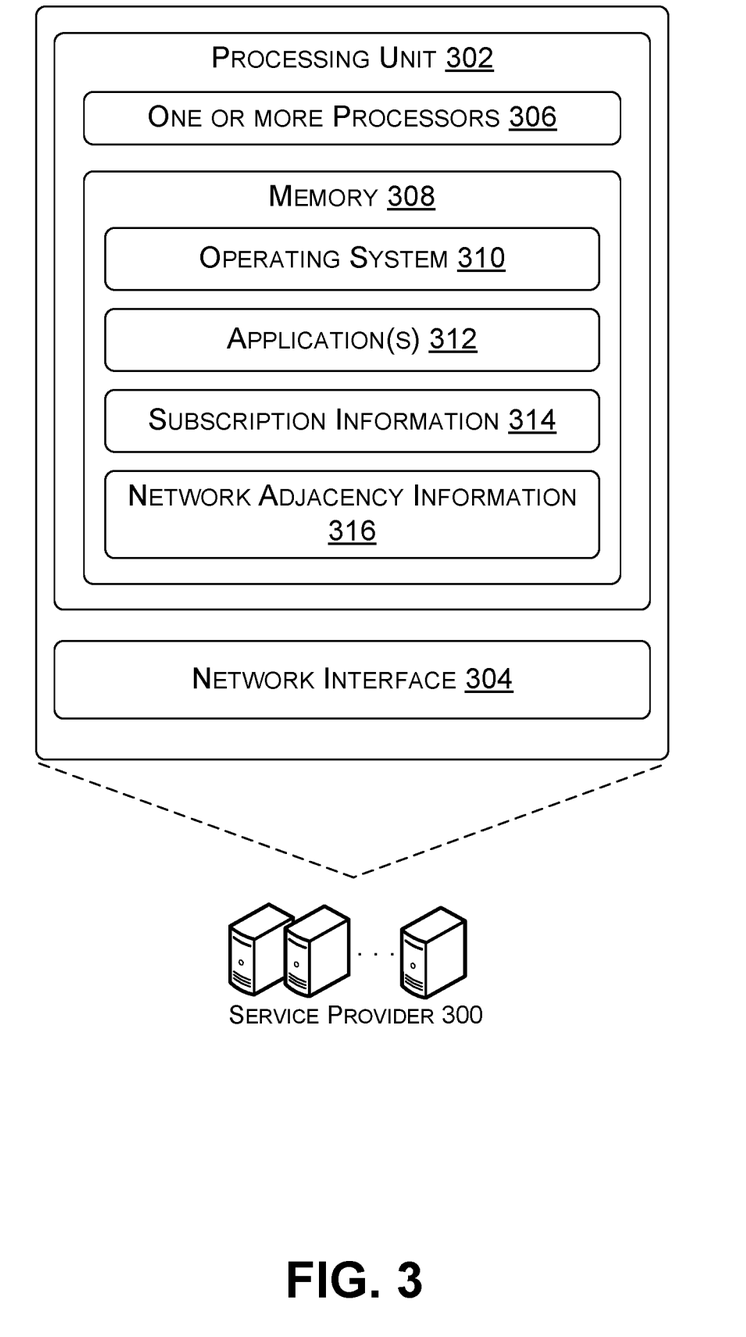
FIG. 3 is a diagram showing details of an example service provider.

FIG. 3 is a diagram showing details of an example service provider 300, such as the service provider 110 of FIG. 1. In examples, the service provider 300 may implement a central agent (e.g., operations described herein in reference to a central agent). The service provider 300 may be implemented as one or more computing devices, such as a server, desktop computer, laptop computer, etc. The service provider 300 may include a processing unit 302 and a network interface 304. The processing unit 302 may include one or more processors 306 and memory 308. The one or more processors 306 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The memory 308 may include an operating system (OS) 310 and one or more applications 312 that are executable by the one or more processors 306. In some examples, the one or more applications 312 may be configured to receive and/or act on resource consumption data collected from network communication devices.

In some examples, the memory 308 stores subscription information 314. The subscription information 314 may be based on subscription information received from network communication devices (e.g., a root node or any other node). For example, the subscription information 314 may include, for each multicast group, a list of networks that have at least one member in the respective multicast group. Additionally, or alternatively, the memory 308 may store network adjacency information 316. The network adjacency information 316 may be based on network adjacency information received from network communication devices (e.g., a root node or any other node). For example, the network adjacency information 316 may indicate, for each network, one or more networks that are adjacent (e.g., neighboring) to the respective network and/or a cost of communication with the one or more networks.

The memory 308 is an example of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

Example Processes

Figure 4:
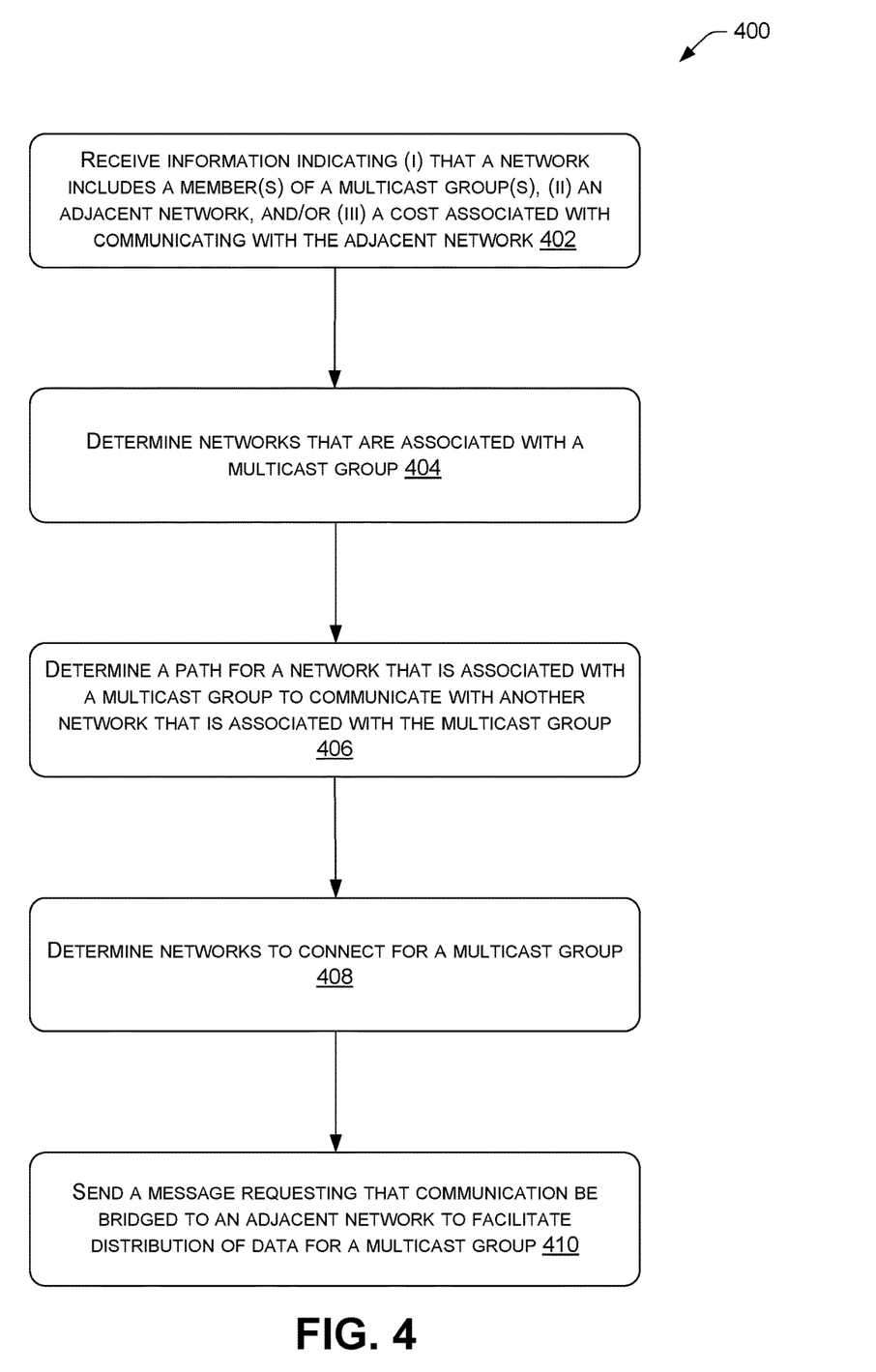
FIG. 4 illustrates an example process to bridge communication between multiple networks to facilitate distribution of multicast data.
Figure 5A:
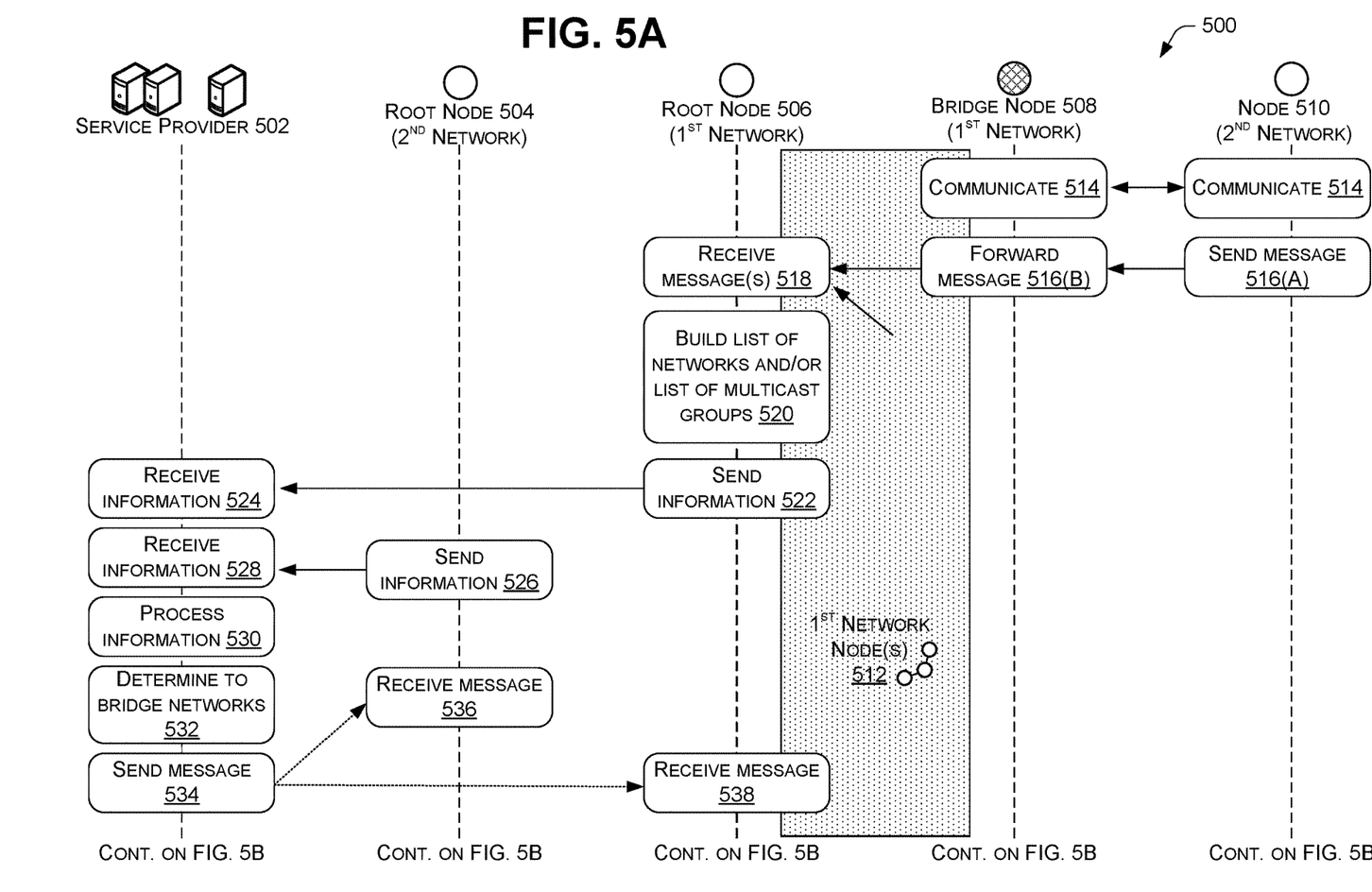
FIG. 5A-5B illustrate an example process to bridge communication between networks.
Figure 5B:
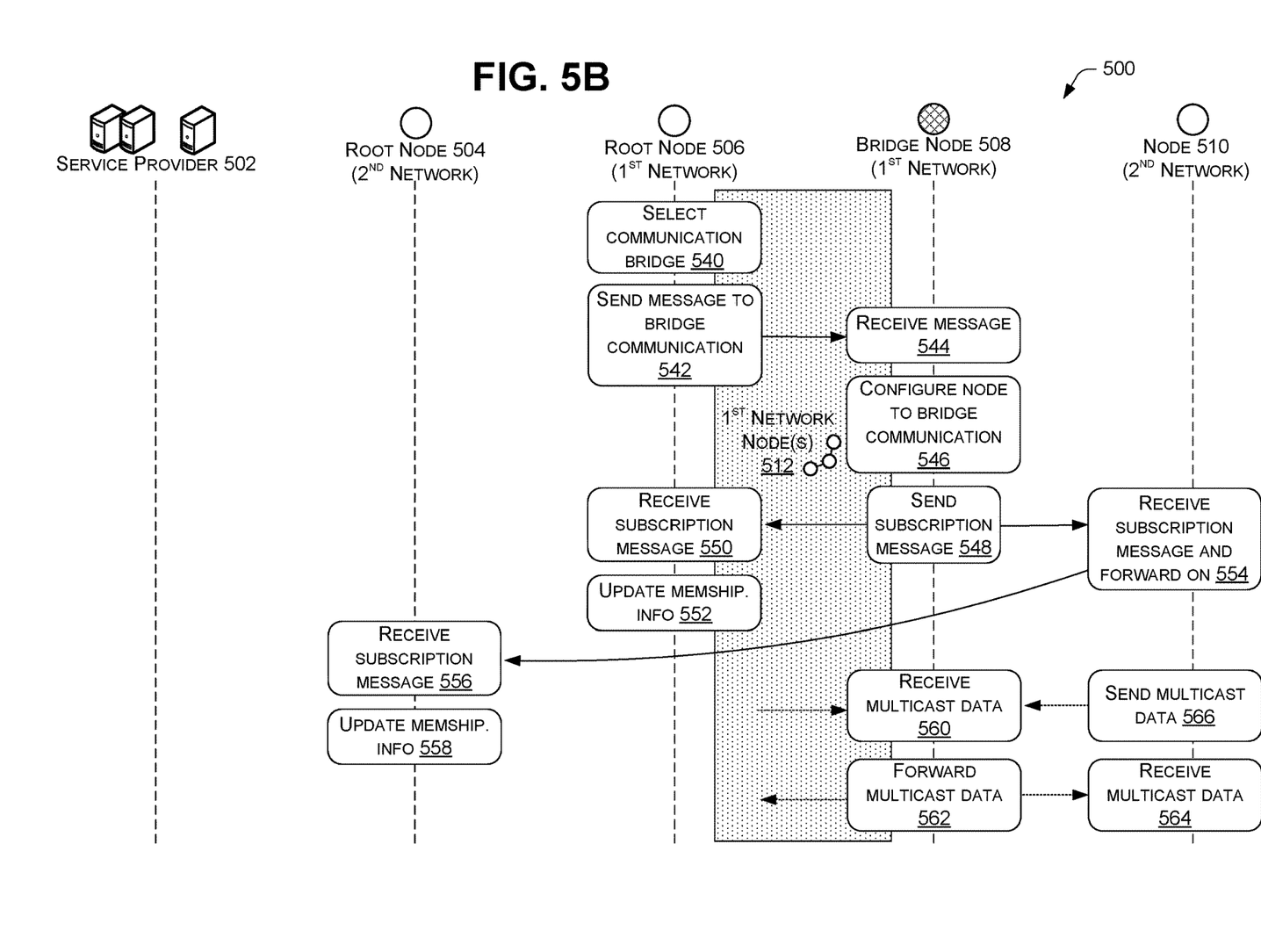

FIGS. 4 and 5A-5B illustrate example processes 400 and 500 for employing the techniques discussed herein. The processes 400 and/or 500 may be performed by any device, such as the node 200 and/or the service provider 300. For example, the process 400 may be performed by the service provider 300 (or the node 200, in some cases), while the process 500 may be performed by devices illustrated in FIGS. 5A-5B. For ease of illustration, the processes 400 and 500 may be described as being performed by a computing device. However, the processes 400 and 500 may be performed by any device.

The processes 400 and 500 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 4 illustrates the example process 400 to bridge communication between multiple networks to facilitate distribution of multicast data.

At 402, a computing device may receive information indicating (i) that a network includes a member(s) of a multicast group(s), (ii) an adjacent network, and/or (iii) a cost associated with communicating with the adjacent network. For example, the computing device may receive, from a node of a network, information indicating (i) that the network includes a member(s) of a multicast group(s), (ii) an adjacent network to the network (e.g., another network that the network has communicated with), and/or (iii) a cost associated with the network communicating with the adjacent network. A cost associated with communicating with an adjacent network may include a value representing a data rate for communicating with the adjacent network, a distance to the adjacent network, a communication load associated with the adjacent network, etc. Operation 402 may be repeated for any number of networks that are managed by the computing device (e.g., receive information from each root node of a plurality of networks that are managed by the computing device).

At 404, the computing device may determine networks that are associated with a multicast group. This may be based on the information received at 402. For example, the computing device may determine that a first network and a second network each have at least one member of the same multicast group. Operation 404 may be repeated for any number of multicast groups (e.g., determine networks associated with a first multicast group, determine networks associated with a second multicast group, etc.).

At 406, the computing device may determine a path for a network that is associated with a multicast group to communicate with another network that is associated with the multicast group. This may be based on the information received at 402. In examples, the computing device uses a shortest-path algorithm, such as a Dijkstra algorithm, a Floyd-Warshall algorithm, an Open Shortest Path First (OSPF) algorithm, etc. For example, the computing device may determine a shortest path. A path may indicate networks along which to relay data for a multicast group.

In examples, operation 406 may be repeated for any number of networks that are associated with the multicast group. For example, if a multicast group is associated with three networks, the computing device may determine a first path for a first network to communicate with a second network and a second path for the first network to communicate with a third network.

In examples, at 406, the computing device may represent networks with a graph of nodes and edges. Each node may represent a network and/or each edge may represent a connection to an adjacent network (e.g., that a network is able to communicate with an adjacent network). The nodes may be positioned based on the information received at 402 (e.g., adjacencies indicated in the information). The computing device may associate each edge in the graph with a weight that may correspond to a cost of communicating between nodes attached to the edge. The weights may be associated with the edges based on the information received at 402 (e.g., costs indicated in the information). The computing device may then use a path algorithm to determine, for individual nodes in the graph that each represent a network with a member of a multicast group, a path from a particular node (that represents a network that has a member of the multicast group) to the respective node.

At 408, the computing device may determine networks to connect (e.g., bridge) for a multicast group. For example, based on one or more paths determined at 406, the computing device may determine one or more networks along the one or more paths to each act as a bridge between other networks. A network along a path may have a member of a multicast group or may not have a member of the multicast group. Operation 408 may be repeated for any number of multicast groups (e.g., find a list of networks to bridge communication for a first multicast group, find a list of networks to bridge communication for a second multicast group, etc.).

At 410, the computing device may send a message requesting that communication be bridged to an adjacent network to facilitate distribution of data for a multicast group. For example, the computing device may send, to a root node of a network determined at 408, a message requesting that the network establish a connection with a particular adjacent network to allow communications for a multicast group (e.g., a message requesting that the network act as a bridge for multicast data for the multicast group). Operation 410 may be repeated for any number of networks that are to act as a bridge (e.g., send a message to a first network to act as a bridge for the multicast group, send a message to a second network to act as a bridge for the multicast group, etc.).

FIG. 5A-5B illustrate the example process 500 to bridge communication between networks. For ease of discussion, the process 500 is illustrated as being performed by various devices, such as a service provider 502 (like the service provider 110 of FIG. 1), a root node 504 of a second network, a root node 506 of a first network, a bridge node 508 of the first network, and a node 510 of the second network. In many instances, the service provider 502 implements a central agent to determine bridge communications requirements between networks.

In FIGS. 5A-5B, a first network of node(s) 512 is illustrated between the root node 506 and the bridge node 508. This represents one or more nodes of the first network. For example, communications between the root node 506 and the bridge node 508 may generally occur via the first network of node(s) 512 (e.g., node-by-node through the first network). However, in other instances the first network of node(s) 512 is eliminated and the root node 506 and the bridge node 508 communicate directly with each other.

In FIG. 5A, at 514, the bridge node 508 and the node 510 may communicate. This may include sending and/or receiving any number of communications to discover each other. For example, the bridge node 508 and/or the node 510 may send a message (e.g., broadcast) to neighboring nodes to discover other proximate nodes and/or form a parent-child relationship. Based on such communication, the bridge node 508 and/or the node 510 may join a network (e.g., form a parent-child relationship with a node of a network). During this process, the bridge node 508 and the node 510 discover that they are within communication range of each other, but ultimately the bridge node 508 joins the first network and the node 510 joins the second network.

At 516(A), the node 510 may send a message to the bridge node 508, and at 516(B), the bridge node 508 may forward that message on to the root node 506. The message may indicate membership of the node 510 to the second network. The message may include a network identifier (e.g., PAN identifier) of the second network. In some instances, the message is sent in a DAO communication, while in other instances the message is sent in other types of communications. As such, the message may indicate that the node 510 has communicated with the bridge node 508 and/or that the bridge node 508 could potentially be a parent to the node 510. By sending such message into a neighboring network, the root node 506 of the neighboring network may identify adjacent networks.

Although not illustrated in FIG. 5A, the node 510 may also send a message to the root node 504 of its own network, the second network. The message may indicate membership of the node 510 to the second network.

Further, although also not illustrated in FIG. 5A, the bridge node 508 may similarly send a message up to the root node 506 of the first network and a message up to the root node 504 of the second network. Each message may indicate membership of the bridge node 508 to the first network.

At 518, the root node 506 may receive the message originating from the node 510. The root node 506 may also receive one or more subscription messages from the first network node(s) 512 (or the bridge node 508) indicating subscription of the first network node(s) 512 (or the bridge node 508) to one or more multicast groups. The root node 506 may receive subscription messages over time as nodes subscribe to one or more multi cast groups.

At 520, the root node 506 may build a list of networks that have communicated with the first network and/or a list of multicast groups that have members in the first network. For example, upon receiving the message originating from the node 510 and identifying the second network, the root node 506 may update the list of networks to indicate that a node of the first network has received a communication from a node of the second network. Here, a network identifier for the second network may be included in the list of networks. In another example, upon receiving a subscription message indicating that a particular node is subscribing to a multicast group, the root node 506 may update the list of multicast groups for the first network to indicate that the particular node is a member of the multicast group. Here, a multicast group identifier (e.g., multicast group address) may be included in the list of multicast groups. As such, as part of operation 520, the root node 506 may determine that a node of the first network has communicated with a node of the second network and/or that the first network includes a member of a particular multicast group.

At 522, the root node 506 may send information to the service provider 502. The information may include the list of networks and/or the list of multicast groups.

At 524, the service provider 502 may receive the information from the root node 506.

At 526, the root node 504 of the second network may send information to the service provider 502, and at 528, the service provider 502 may receive the information. The information may include a list of networks that have communicated with the second network and/or a list of multicast groups that have members in the second network. Such information may have been created at the root node 504 in a similar fashion as that done at operation 520 (e.g., as messages are received indicating subscriptions and/or communication with other networks).

At 530, the service provider 502 may process the information received from the root node 504 and the information received from the root node 506. For example, the service provider 502 may analyze the lists of multicast groups received from the root nodes 504 and 506 to build, for each multicast group, a list of networks that include at least one member of the respective multicast group. The service provider 502 may also analyze the lists of networks received from the root nodes 504 and 506 to determine a plurality of networks that are needed to bridge communication to a list of networks that include at least one member for a particular multicast group. In some examples, operation 530 includes performing one or more of operations described in reference to FIG. 4 (e.g., operations 404, 406, 408, etc.).

In examples, at 530, the service provider 502 may determine a bridge list for a particular network. The bridge list may indicate adjacent networks of the plurality of networks that the particular network needs to connect to in order to facilitate distribution of multicast data. This process may be repeated for each multicast group.

At 532, the service provider 502 may determine to bridge communication between multiple networks for a multicast group to allow distribution of multicast data to members of the multicast group. The determination may be based on the processing at operation 530. For example, the service provider 502 may determine to bridge the first network and the second network for a multicast group when the first network and the second network each have at least one member to the multicast group. In some instances, the service provider 502 may determine to bridge communication for adjacent networks that include members in the same multicast group. In other instances, the service provider 502 may determine to bridge communication for networks that include members in the same multicast group, but are not adjacent networks. Here, the service provider 502 may determine to use an intermediary network without members in a multicast group.

At 534, the service provider 502 may send a message to the root node 504 and/or the root node 506. The message may request that communication be bridged with another network for a multicast group to allow distribution of multicast data to members of the multicast group. The message may include a bridge list for a multicast group. Although operation 534 is illustrated as sending a message to the root node 504 and the root node 506, in many instances the message is sent to only one of the root nodes. This may avoid duplicative processing at the root nodes to configure a node to bridge communication and/or reduce duplicate multicast data at some nodes.

In the example illustrated in FIG. 5A, the first network and the second network are adjacent to each other and each include at least one member in the same multicast group. Here, the service provider 502 sends a message to either the root node 504 and/or the root node 506 requesting that communication be bridged between the first and second networks for the multicast group. The service provider 502 may send a bridge list to the root node 504 and/or the root node 506. For instance, if the message is sent to the root node 506, the bridge list for the multicast group for the root node 506 would list the second network (e.g., list the network identifier for the second network).

In another example, not illustrated in FIG. 5A, assume that the first network and the second network are not adjacent to each other, but a third network is positioned between the two. Also, assume that the first network and the second network include members in the same multicast group, but the third network does not. Here, the service provider 502 may send a message to any of the root nodes requesting that communication be bridged for the multicast group. For instance, the message may be sent to the root node of the third, intermediary network with the bridge list for the multicast group. The bridge list may list the first network and the second network.

At 536, the root node 504 may receive the message from the service provider 502 regarding a communication bridge between networks for a multicast group.

Alternatively, or additionally, at 538, the root node 506 may receive the message from the service provider 502 regarding a communication bridge.

The example of FIGS. 5A-5B focuses on the root node 506 receiving the message and performing processing based on such receipt, as discussed below. Although similar processing may be performed by the root node 504.

In examples, upon receiving the message regarding the communication bridge at 538, the root node 506 may check to see (i) if the root node 506 has received a subscription message (to the multicast group) that originated at a node of the second network (e.g., is the node 510 a member of the multicast group), or (ii) if a node of the first network that has communicated with a node of the second network is a member of the multicast group (e.g., is the node 508 a member of the multicast group). In other words, the root node 506 checks to see if a node of the second, adjacent network that is able to communicate with the first network is a member of the multicast group and/or a node of the first network that is able to communicate with the second network is a member of the multicast group.

In examples, if the condition (i) and/or the condition (ii) is true (e.g., either or both of those nodes is a member), then the root node 506 does not need to do anything. Here, a PST would have already been established to link communication for the multicast group between the two networks. In other words, no bridge node is needed, because the networks would already be configured to distribute multicast data between the networks for the multicast group. For example, if the node 510 were already a member to the multicast group, then the node 510 would have already sent a subscription message into the first network for the multicast group. The subscription message would have been received by the node 508 and forwarded up to the root node 506 to form part of the PST in the first network. The rule used to facilitate this is to have a member (normal or conscripted) that is able to communicate with an adjacent network, send a subscription message in the member's network and the adjacent network when the node becomes the member.

In examples, if the condition (i) and the condition (ii) are false (e.g., neither of those nodes is a member), the root node 506 proceeds to perform operation 540 in FIG. 5B. Here, the selected node is a non-member node to the multicast group.

At 540, the root node 506 may select a node to bridge communication between the first network and the second network for a multicast group. The root node 506 may select a node of the first network that has previously communicated, or is otherwise able to communicate, with a node of the second network. The node may be selected based on a variety of information that is available to the root node 506. For example, the root node 506 may select a node within the first network that is closest to a member of the multicast group and that is within communication range of a node of the second network. In another example, the root node selects a node to provide the least routing cost between members of the multicast group and the node acting as the bridge (for example. the lowest number of transmissions to route data to members of the multicast group, or other measure of routing cost). In some instances, the same node is selected for different multicast groups, while in other instances separate nodes are selected for different multicast groups. To illustrate, a node that is currently acting as a bridge between networks for a first multicast group, may be selected to act as a bridge between those networks for a second multicast group.

At 542, the root node 506 sends a message to bridge communication between the first network and the second network for the multicast group. In this example, the bridge node 508 is selected to bridge communication, and thus, the message is sent to this node. At 544, the bridge node 508 receives the message from the root node 506.

At 546, the bridge node 508 is configured to bridge communication between the first network and the second network for the multicast group. In many instances, the operation 546 may include configuring the bridge node 508 to act as a virtual member of the multicast group. In such instances, the message sent at operation 542 instructs the bridge node 508 to become a virtual member of the multicast group.

To become a virtual member, the bridge node 508 may send, at 548, a subscription message to the root node 506 of the first network. The subscription message may be received at 550 by the root node 506 of the first network. In other words, the subscription message may be sent node-by-node through the first network node(s) 512 to reach the root node 506. The subscription message may indicate that the bridge node 508 is becoming a virtual member of the multicast group. In response to receiving the subscription message indicating that the bridge node 508 is joining the multicast group as a virtual member, the root node 506 may update membership information for the multicast group at 552 (e.g., add the bridge node 508 and/or a multicast identifier for the multicast group to the list of multicast groups for the first network). The bridge node 508 may be flagged as a virtual member.

Additionally, to become the virtual member, the bridge node 508 may communicate with the node 510 of the second network via one or more nodes of the second network to form a communication bridge. As also illustrated at 548, this may include sending a subscription message to the node 510 to indicate that the bridge node 508 is becoming a virtual member of the multicast group. The subscription message may be received at 554 by the node 510 and forwarded on to the root node 504 of the second network. The subscription message may be sent node-by-node through one or more nodes of the second network to reach the root node 504 of the second network. The root node 504 may receive the subscription message at 556. In response to receiving the subscription message indicating that the bridge node 508 is joining the multicast group as a virtual member, the root node 504 may update membership information for the multicast group at 558 (e.g., add the bridge node 508 and/or a multicast identifier for the multicast group to the list of multicast groups for the second network). The bridge node 508 may be flagged as a virtual member.

In some instances, the subscription message sent at 548 is sent in a DAO communication, while in other instances the subscription message is sent in other formats.

Sending the subscription message up the first network and/or up the second network may cause a portion of a PST to be formed for the multicast group. For example, one or more messages may be sent to nodes in the first network and/or the second network to disable a pruning state and/or otherwise configure nodes so that the bridge node 508 receives multicast data for the multicast group. The PST may facilitate the distribution of multicast data for the multicast group between the first network and the second network.

In general, a virtual member of a multicast group performs operations like a member of the multicast group, but without processing multicast data. For example, the virtual member may receive multicast data for the multicast group in a similar fashion as if it were an actual member of the multicast group. The virtual member may also forward on the multicast data as needed (e.g., based on a PST structure). A virtual member does not usually process multicast data (e.g., at an application layer), but merely passes the multicast data on to another node.

In examples, if the bridge node 508 ever becomes an actual member of the multicast group, the bridge node 508 transmits a normal subscription message indicating membership in the multicast group. The subscription message may traverse each of the first and second networks to reach the respective root nodes. The root node 506 and the root node 504 may remove the designation of the bridge node 508 as a virtual member and list the bridge node 508 as a member.

Although the example of FIGS. 5A-5B discuss the bridge node 508 of the first network becoming a virtual member, in other instances the bridge node 508 may communicate with the node 510 of the second network to cause the node 510 to become the virtual member. Here, the node 510 may be implemented as a "bridge node" or "conscript," instead of the bridge node 508.

At some point after the bridge node 508 becomes a virtual member, and a PST is formed with the bridge node 508, multicast data for the multicast group may be distributed to members of the multicast group. In one example, multicast data originates in the first network and is sent from the first network node(s) 512. The bridge node 508 receives the multicast data at 560, and then forwards the multicast data on to the second network by sending it to the node 510, at 562. The multicast data may be received by the node 510 at 564. The multicast data may then be distributed through the second network according to the PST. In another example, multicast data that originates in the second network is sent, at 566, by the node 510 to the bridge node 508. The bridge node 508 receives the multicast data at 560 and forwards the multicast data on to the first network of nodes at 562 according to the PST. This may allow multicast data to be distributed to members of both networks.

Example Message

Figure 6:
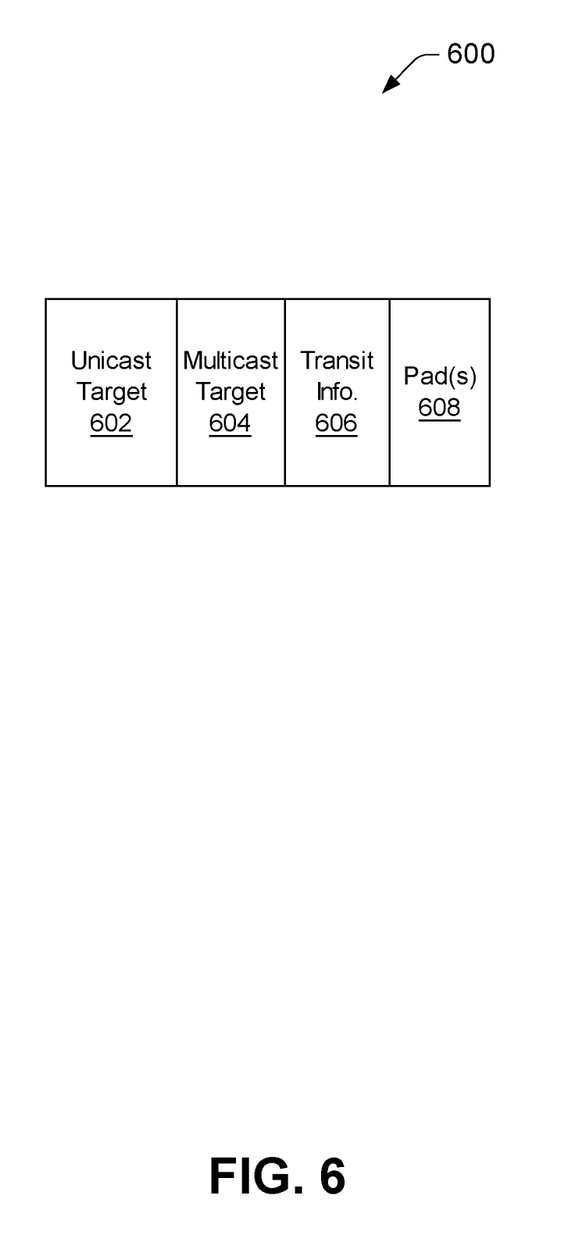
FIG. 6 illustrates an example portion of a subscription message to advertise that a node is a member of a multicast group.

FIG. 6 illustrates an example portion of a subscription message 600 to advertise that a node is a member of a multicast group. The portion of the subscription message 600 may form a Destination Advertisement Object (DAO) Base Object of a DAO message (e.g., ICMPv6 message). That is, the subscription message may correspond to the DAO message used in a Routing Protocol for Low Power and Lossy Networks (RPL) protocol, while the portion of the subscription message 600 may correspond to the DAO Base Object. However, the subscription message may take other forms and/or be implemented in other protocols.

A DAO message may generally be transmitted hop-by-hop to allow nodes in a network to have information about their sub-trees and/or optimize point-to-point routing. In many instances, a DAO message is transmitted by a node up the network to join the node to a root node and/or to maintain an existing relationship with a root node.

In this example, the portion of the DAO message 600 has a Unicast Target option 602, which carries an address (e.g., global unicast IPv6 address) of a given target. The Unicast Target option 602 identifies the node that originated the DAO message, such as the node that is subscribing to a multicast group.

The portion of the DAO message 600 also has a Multicast Target option 604 set to a multicast group address associated with a multicast group to which the node is subscribing. As such, the Multicast Target Option may indicate the multicast group to which the node is subscribing. To illustrate, the Multicast Target option 602 may carry a multicast address (e.g., IPv6 address) to which a concerned unicast target subscribes.

As illustrated, the portion of the DAO message 600 has a Transit Information option 606, which carries the unicast address (e.g., global IPv6 address) of a DAO parent of the concerned unicast target. Further, the portion of the DAO message 600 includes one or more Pad options 608 to ensure that a total length of a header is a multiple of 8 bytes.

Although illustrated in a particular order, any of the options 602-608 may be arranged differently. Further, any of the options 602-608 may be used in other types of messages and/or omitted from the DAO message.

The options 602-606 may be repeated for each RPL Unicast Target described in the DAO. Furthermore, the option 606 may be repeated for each DAO parent of the concerned unicast target. Further, the Multicast Target option 602 may occur N times (where N is an integer greater than or equal to zero and corresponds to the number of multicast groups of which the node is a member). For example, if the node is a member of multiple multicast groups, the multicast address (i.e., the multicast Target option 602) of each group would be included, one after the other, in the DAO.

The information in the portion of the DAO message 600 may be inspected as the DAO message is transmitted throughout a network (e.g., at each hop). For example, the Unicast Target option 602 and the Multicast Target option 604 may be inspected to identify a multicast group to which the node is subscribing. This information may be used to update a data structure indicating membership of the node in the multicast group.

What is claimed is:

1. One or more non-transitory computer-readable media storing executable instructions that, when executed by one or more processors of a central agent, cause the one or more processors to perform operations comprising:
   receiving, from a first root node of a first network, first information indicating (i) that the first network includes at least one member of a multicast group, (ii) a first adjacent network to the first network, and (iii) a cost of communicating with the first adjacent network;
   receiving, from a second root node of a second network, second information indicating (i) that the second network includes a member of the multicast group, (ii) a second adjacent network to the second network, and (iii) a cost of communicating with the second adjacent network;
   based at least in part on the first information and the second information, determining that the first network and the second network each have at least one member of the multicast group;
   based at least in part on the first information and the second information, determining, using a shortest-path algorithm, a path for the first network to communicate with the second network, the path including multiple networks; and
   sending, to at least one root node of a network of the multiple networks on the path, a message requesting that communication be bridged to allow distribution of data for the multicast group.

2. The one or more non-transitory computer-readable media of claim 1, wherein the multiple networks on the path include a third network that does not have a member of the multicast group.

3. The one or more non-transitory computer-readable media of claim 1, wherein the operations further comprise:
   based at least in part on the first information and the second information, determining, using the shortest-path algorithm, another path for the second network to communicate with the first network, the other path including other multiple networks;
   wherein the sending further includes sending, to at least one root node of a network of the other multiple networks on the other path, a message requesting that communication be bridged to allow distribution of data for the multicast group.

4. The one or more non-transitory computer-readable media of claim 1, wherein the shortest-path algorithm includes at least one of a Dijkstra algorithm, a Floyd-Warshall algorithm, or an Open Shortest Path First (OSPF) algorithm.

5. The one or more non-transitory computer-readable media of claim 1, wherein the determining the path comprises:
   representing networks with a graph of nodes and edges, a first node of the graph representing the first network and a second node of the graph representing the second network, the first node being positioned adjacent to a third node in the graph based at least in part on the first information, and the second node being positioned adjacent to a fourth node in the graph based at least in part on the second information;
   associating each edge in the graph with a weight, a first weight for an edge connected to the first node corresponding to the cost of communicating with the first adjacent network, and a second weight for an edge connected to the second node corresponding to the cost of communicating with the second adjacent network; and
   using the shortest-path algorithm to determine, for individual nodes in the graph that represent a network with a member of the multicast group, a path from the first node to the respective node.

6. The one or more non-transitory computer-readable media of claim 1, wherein the cost of communicating with the first adjacent network represents at least one of a data rate for communicating with the first adjacent network, a distance to the first adjacent network, or a communication load associated with the first adjacent network.

7. A computing device comprising:
one or more processors; and
memory communicatively coupled to the one or more processors, the memory storing one or more instructions that, when executed by the one or more processors, cause the one or more processors to perform operations comprising:
receiving, from each network of a plurality of networks, information indicating (i) that the respective network includes a member of a multicast group, (ii) an adjacent network to the respective network, and (iii) a cost associated with communicating with the adjacent network, the plurality of networks including a first network and one or more other networks;
based at least in part on the information from the plurality of networks, determining that each of the plurality of networks has at least one member of the multicast group;
based at least in part on the information from the plurality of networks, determining, for each of the one or more other networks and using a shortest-path algorithm, one or more paths for the first network to communicate with the respective network, the one or more paths including multiple networks; and
sending, to at least one network on the one or more paths, a message requesting that communication be bridged to allow distribution of data for the multicast group.

8. The computing device of claim 7, wherein the shortest-path algorithm includes at least one of a Dijkstra algorithm, a Floyd-Warshall algorithm, or an Open Shortest Path First (OSPF) algorithm.

9. The computing device of claim 7, wherein the determining the path comprises:
representing networks with a graph of nodes and edges, the networks including the plurality of networks;
associating each edge in the graph with a weight that corresponds to a cost of communicating between nodes; and
using the shortest-path algorithm to determine, for individual nodes in the graph that represent a network with a member of the multicast group, a path from a particular node to the respective node.

10. The computing device of claim 7, wherein the cost associated with communicating with the adjacent network represents at least one of a data rate for communicating with the adjacent network, a distance to the adjacent network, or a communication load associated with the adjacent network.

11. The computing device of claim 7, wherein the information, for a network of the plurality of networks, indicates that the adjacent network has communicated with the network.

12. The computing device of claim 7, wherein the computing device comprises a service provider.

13. The computing device of claim 7, wherein the message indicates a particular network to bridge communication to.

14. The computing device of claim 7, wherein the receiving the information from each network of the plurality of networks comprises receiving the information from each root node of the plurality of networks, and wherein the sending the message requesting that communication be bridged comprises sending, to at least one root node of the one or more other networks on the path, the message requesting that communication be bridged.

15. A method comprising:
receiving, from a first root node of a first network and from a second root node of a second network, information indicating (i) that each network includes a member of a multicast group, and (ii) a neighboring network to each network;
based at least in part on the information from each network, determining that each network has at least one member of the multicast group;
based at least in part on the information from each network, determining a path for the first network to communicate with the second network, the path including one or more other networks; and
sending, to at least one root node of a network of the one or more other networks, a message requesting that communication be bridged to allow distribution of data for the multicast group.

16. The method of claim 15, wherein the determining the path for the first network to communicate with the second network comprises determining, using a shortest-path algorithm, a shortest path for the first network to communicate with the second network.

17. The method of claim 16, wherein the shortest-path algorithm includes at least one of a Dijkstra algorithm, a Floyd-Warshall algorithm, or an Open Shortest Path First (OSPF) algorithm.

18. The method of claim 15, wherein the determining the path comprises:
representing networks with a graph of nodes and edges, the networks including the first network and the second network;
associating each edge in the graph with a weight that corresponds to a cost of communicating between nodes; and
using a shortest-path algorithm to determine, for individual nodes in the graph that represent a network with a member of the multicast group, a path from a particular node to the respective node.

19. The method of claim 15, wherein the information from the first network and the second network indicates a cost for at least one of the first network or the second network to communicate with the neighboring network.

20. The method of claim 15, wherein the information from the first network and the second network indicates that the neighboring network has communicated with at least one of the first network or the second network.

* * * * *